United States Patent Office 2,909,523
Patented Oct. 20, 1959

2,909,523

SUBSTITUTED PIPERAZINES AND METHOD OF PREPARING THE SAME

Frederick L. Bach, Jr., and Herbert J. Brabander, Pearl River, and Samuel Kushner, Nanuet, N.Y., assignors to American Cyanamid Company, New York, N.Y., a corporation of Maine No Drawing. Application October 11, 1957
Serial No. 689,468

8 Claims. (Cl. 260—268)

This invention relates to new organic compounds. More particularly, it relates to 1-[omega-(4-substituted-1-piperazinyl)alkyl]benzoheterocyclic compounds, wherein the hetero atom is nitrogen, and methods of preparing the same.

The preparation of ring-saturated quinoline compounds is known; for example, 1-(5-aminoamyldecahydroquinoline, (Ber., 59B, 1786–91 [1926])). These compounds, however, do not possess effective blood pressure depressor or adrenergic blocking effect, which is true of the compounds of the present invention.

The present compounds may be illustrated by the following general formula:

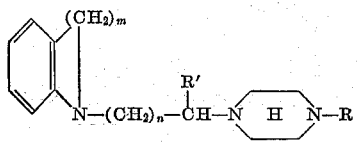

in which R is an aryl, aralkyl, pyridyl, or carbloweralkoxy radical, R' is hydrogen or a lower alkyl radical, $m$ is an integer from 2 to 4, and $n$ is an integer from 1 to 10. The compounds of the present invention possess amino groups and, therefore, will form acid addition salts.

The present compounds are, in general, crystalline solids. They are soluble in the usual organic solvents, such as benzene, chloroform, toluene, and the like. The acid addition salts are soluble in water.

The compounds of the present invention can be prepared by several methods. The preferred method is to heat at refluxing temperature in an alcoholic solvent a bicyclic benzoheterocyclic compound containing one nitrogen atom with an omega haloalkanol. The condensation product is heated with hydrobromic acid, and the resulting 1-(omega-haloalkyl)benzoheterocyclic derivative is finally reacted with a 1-substituted piperazine to produce the desired compounds. The latter reaction is carried out at a temperature of from 50° to 125° C. with or without a solvent.

The present compounds can also be prepared by heating a 4-substituted-1-(omega-haloalkylene)piperazine hydrohalide with the bicyclic benzoheterocyclic compound. The product can then be recovered by treating the reaction mass with a strong base, extracting with an organic solvent, and, following removal of the solvent, further purifying the product by fractional distillation.

The compounds of the present invention are orally active hypotensive agents, which have the ability to lower blood pressure for a long period of time. In general, the intensity and duration of blood pressure depressor effect is comparable to the commonly used hydralazine hydrochloride or hexamethonium chloride. The compounds of the present invention are also active as adrenergic and ganglionic blockading agents of long duration.

They can be administered in the usual pharmaceutical forms, such as tablets, capsules, pills, etc., or they can be administered as constituents of bulk powders or individual dosage powders or liquids.

The following examples illustrate in greater particularity the preparation of representative compounds of the present invention.

*Example 1*

A suspension consisting of 26.6 grams of 1,2,3,4-tetrahydroquinoline, 24.9 grams of 2-bromoethanol, 16.8 grams of sodium bicarbonate, and 150 ml. of ethanol was refluxed 15 hours. After this period of time, the ethanol was removed by distillation under reduced pressure at water bath temperature. The brown, oily residue was basified with cold, aqueous, concentrated potassium hydroxide solution and then extracted with chloroform. The chloroform extracts were combined, decolorized with activated charcoal, fractionated, and the product, 1-(beta-hydroxyethyl)-1,2,3,4-tetrahydroquinoline, was collected at 193° C., 28 to 29 mm. pressure.

Seventeen grams of 1-(beta-hydroxyethyl)-1,2,3,4-tetrahydroquinoline and 200 ml. of 48% hydrobromic acid were combined with cooling in a distilling vessel and subjected to a slow distillation at atmospheric pressure. After collecting approximately 175 ml. of hydrobromic acid, the distillation was discontinued and the reaction mixture was refluxed for 15 hours. The dark-brown, aqueous solution was then concentrated under reduced pressure at 70° C. to a viscous residue, which solidified on standing in an evacuated desiccator. Sixteen grams of the crude 1-(beta-bromoethyl)-1,2,3,4-tetrahydroquinoline monohydrobromide obtained in this manner was condensed with an excess of 1-phenylpiperazine to yield a semi-crystalline reaction mass, which was heated at 95° C. for 24 hours. The reaction mass was triturated with two 100-ml. portions of water, filtered, and the water-insoluble material recrystallized twice from a benzene-ether solution. The desired 1-[2-(4-phenyl-1-piperazinyl)ethyl]-1,2,3,4-tetrahydroquinoline melted at 110° C. to 112° C.

*Example 2*

Three-and-one-half grams of 1-[2-(4-phenyl-1-piperazinyl)ethyl]-1,2,3,4-tetrahydroquinoline was treated with one molar equivalent of 3.11 N hydrochloric acid, and the resulting salt was recrystallized from ethanol. A pure sample of the monohydrochloride of 1-[2-(4-phenyl-1-piperazinyl)ethyl]-1,2,3,4-tetrahydroquinoline melted at 235° C. to 240° C.

*Example 3*

The monohydrobromide of 1-(beta-bromoethyl)-1,2,3,4-tetrahydroquinoline (16.0 grams) was condensed with 24.6 grams of 1-(2-pyridyl)piperazine in the absence of a solvent. After standing one hour, the semi-solid reaction mass was heated 18 hours at 95° C. and then cooled to room temperature. The gummy product was treated with 100 ml. of water, made strongly alkaline with potassium hydroxide solution (50%), and extracted with chloroform. After decolorizing the combined extracts, the solvent was removed, and the oily residue was distilled under reduced pressure. A forerun boiling at 140° C. to 160° C. at 0.6 mm. pressure was discarded and 1-{2-[4-(2'-pyridyl)-1-piperazinyl]ethyl}-1,2,3,4-tetrahydroquinoline was collected at 185°–195° C. at 0.7 mm. pressure.

*Example 4*

A mixture consisting of 23.1 grams of 1-(beta-bromoethyl)-4-phenylpiperazine hydrobromide and 23.8 grams of indoline was heated at water bath temperature for 15 hours. The quasi-crystalline reaction mass was cooled, made strongly alkaline with an excess of concentrated aqueous sodium hydroxide solution and subjected to a steam distillation. Two 100-ml. portions of ether were used to extract the undistilled organic material, and the ether extracts were combined, decolorized with charcoal, and dried over anhydrous potassium carbonate. After removing the solvent at reduced pressure, the oily residue was distilled, and 1-[2-(4-phenyl-1-piperazinyl)ethyl]indoline was collected at 265° C. to 270° C., 0.2 mm. pressure. The distillate solidified on standing and melted at 58° C.–60° C.

*Example 5*

1-[2-(4-phenyl - 1 - piperazinyl)ethyl]indoline (1.12 grams) was partially dissolved in 20 ml. of ethanol and treated with 0.95 ml. of 3.8090 N hydrochloric acid. The solution was warmed, decolorized with activated charcoal, and concentrated to 10 ml. On cooling, ether was added until turbidity developed, and on standing the monohydrochloride of 1-[2-(4-phenyl - 1 - piperazinyl)ethyl]indoline was deposited as needle crystals; melting point 202° C. to 205° C. with decomposition.

*Example 6*

Indoline (2.8 grams) was mixed with 5.3 grams of 1-omega-bromodecyl-4-carbethoxypiperazine hydrobromide, and the resulting mixture was heated at steam bath temperature for two hours. Water was then added to the reaction mass, which was made basic using a concentrated, aqueous potassium hydroxide and extracted with chloroform. The combined chloroform extracts (100 ml.) were decolorized with activated charcoal and concentrated to a heavy, brown oil. The desired product, 1-[10-(4-carbethoxy-1-piperazinyl)decyl]indoline (boiling point 230° C.–235° C. at 0.15 mm. pressure) was obtained by fractionally distilling the oily residue.

*Example 7*

Ten grams of 1-(beta-hydroxyethyl)-4-phenylpiperazine was treated with 200 ml. of 48% hydrobromic acid at 0°–5° C. and the resulting mixture was subjected to a slow distillation at atmospheric pressure. After 155 ml. of hydrobromic acid had been collected, the residual material was refluxed for ten hours and then concentrated under reduced pressure to a semi-crystalline mass. This crude material solidified on standing two days in an evacuated desiccator. The 1-(beta-bromoethyl)-4-phenylpiperazine hydrobromide (4.5 g.) was condensed with 1,2,3,4-tetrahydroquinoline, which was added in a four-fold excess, and the quasi-crystalline reaction product was washed with two 100-ml. portions of water. The insoluble product was recrystallized from benzene to yield 1-[2-(4-phenylpiperazinyl)ethyl]-1,2,3,4-tetrahydroquinoline, melting point 110° C. to 112° C.

*Example 8*

An ethereal solution of α-bromobutyryl chloride (18.6 g. in 100 ml. of anhydrous ether) is added with stirring to a cooled, ethereal solution of 23.8 g. of indoline in 300 ml. of anhydrous ether. An immediate reaction takes place, and after the last addition of acid chloride, the precipitated indoline monohydrochloride is removed by filtration. The clear filtrate is concentrated and on cooling deposits approximately 16.0 g. of 1α-bromobutyryl indoline.

Sixteen grams of crude 1α-bromobutyryl indoline are then added to a suspension of 10.6 g. of 1-benzylpiperazine and 5.7 g. of sodium bicarbonate in 200 ml. of ethanol. The mixture is refluxed for fifteen hours, filtered, and concentrated to a yellow oil. An excess of concentrated, aqueous sodium hydroxide solution is added to the residue and two 100 ml. portions of chloroform are used to extract the organic material.

The combined chloroformic extracts are decolorized using activated charcoal, dried over anhydrous potassium carbonate, filtered, and then concentrated to a viscous oil, which solidified on standing. Approximately 15.3 g. (70%) of 1-[α-(4-benzyl-1-piperazinyl)butyryl]indoline is obtained in this manner; melting point 113°–115° C.

Using a Soxhlet extractor, 13.1 g. of 1-[α-(4-benzyl-1-piperazinyl)butyryl]indoline is gradually dissolved in a slurry of lithium aluminum hydride (4.2 g.) in 175 ml. of anhydrous ether. After addition is complete, the suspension is refluxed gently for 24 hours and then decomposed, using water and 15% sodium hydroxide solution. The ethereal layer is separated, dried over anhydrous copper sulfate, and concentrated to a yellow, oily residue. The crude reaction product is then fractionated under reduced pressure to yield 6.0 g. of 1-[2-(4-benzyl-1-piperazinyl)-butyl]indoline; boiling point 240°–245° C. (5.0 mm.). Reduction of the carbonyl group was verified by an infrared analysis.

We claim:

1. A compound selected from the group having the general formula:

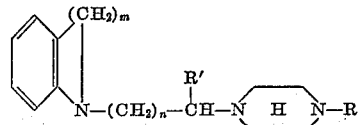

in which R is a member of the group consisting of phenyl, benzyl, pyridyl, and carbloweralkoxy radicals, R′ is a member of the group consisting of hydrogen and lower alkyl radicals, m is an integer from 2 to 4, n is an integer from 1 to 10, and acid addition salts thereof.

2. A 1-[omega-(4-phenyl-1-piperazinyl)alkyl]-1,2,3,4-tetrahydroquinoline wherein the alkyl radical contains 1 to 10 carbon atoms.

3. The compound 1-[2-(4-phenyl-1-piperazinyl)ethyl]-1,2,3,4-tetrahydroquinoline.

4. The compound 1-[2-(4-phenyl-1-piperazinyl)ethyl]-1,2,3,4-tetrahydroquinoline hydrochloride.

5. The compound 1-{2-[4-(2′-pyridyl)-1-piperazinyl]ethyl}-1,2,3,4-tetrahydroquinoline.

6. The compound 1-[2-(4-phenyl-1-piperazinyl)ethyl]indoline.

7. The compound 1-[10-(4-carbethoxy-1-piperazinyl)decyl]indoline.

8. The compound 1-[2-(4-carbethoxy-1-piperazinyl)propyl]indoline.

References Cited in the file of this patent

UNITED STATES PATENTS 2,786,845     Mauss et al.            Mar. 26, 1957